United States Patent
Mock et al.

(10) Patent No.: US 6,315,939 B1
(45) Date of Patent: Nov. 13, 2001

(54) PROCESS FOR PRODUCING STRETCH BLOW FORMED PLASTIC CONTAINERS

(75) Inventors: Elmar Mock, Bienne (CH); Lars Bergholtz, Höganäs (SE)

(73) Assignee: Tetra Laval Holdings & Finance SA, Pully (CH)

( * ) Notice: Subject to any disclaimer, the term of this patent is extended or adjusted under 35 U.S.C. 154(b) by 0 days.

(21) Appl. No.: 09/242,155

(22) PCT Filed: Aug. 13, 1997

(86) PCT No.: PCT/CH97/00296

§ 371 Date: May 14, 1999

§ 102(e) Date: May 14, 1999

(87) PCT Pub. No.: WO98/06559

PCT Pub. Date: Feb. 19, 1998

(30) Foreign Application Priority Data

Aug. 14, 1996 (CH) .................................................. 1997/96

(51) Int. Cl.[7] ............................ B29C 49/46; B29C 49/12
(52) U.S. Cl. .......................... 264/454; 264/525; 264/532; 264/537; 264/85; 264/84; 425/1; 425/DIG. 15
(58) Field of Search ............................... 264/84, 85, 532, 264/537, 525, 454; 425/1, DIG. 15

(56) References Cited

U.S. PATENT DOCUMENTS

| | | | |
|---|---|---|---|
| 3,252,312 | * 5/1966 | Maier | 204/222 |
| 3,908,419 | * 9/1975 | Brownbill | 72/56 |
| 3,957,618 | * 5/1976 | Spirig | 204/270 |
| 4,336,122 | * 6/1982 | Spirig | 204/222 |
| 5,049,330 | 9/1991 | Rebhan | 264/84 |
| 5,366,531 | * 11/1994 | Koide et al. | 65/415 |
| 5,895,666 | * 4/1999 | Brilman | 425/1 |

FOREIGN PATENT DOCUMENTS 2915659 10/1979 (DE) .

OTHER PUBLICATIONS

*Patent Abstracts of Japan*, Band 5, No. 76, 155 M 69, May 20, 1991 of JP 56–27329 (Yoshino Kogyosho K.K.).
*Patent Abstracts of Japan*, Band 5, No. 76, 155 M 69, May 20, 1991 of JP 56–27330 (Yoshino Kogyosho K.K.).

* cited by examiner

Primary Examiner—Jan H. Silbaugh
Assistant Examiner—Suzanne E. McDowell
(74) Attorney, Agent, or Firm—Frishauf, Holtz, Goodman, Langer & Chick, P.C.

(57) ABSTRACT

Stretch blow molded containers are made from a preform made of a plastic material suitable for stretch blow molding such as, e.g., PET. The preform is heated to a temperature suitable for stretch blow molding and is introduced into a mold. An explosive gas mixture is introduced into the preform with a stretching pressure and the preform is axially stretched with the help of a stretching rod. After stretching, the explosive gas mixture is ignited, the explosion creating a blowing pressure which presses the wall of the preform against the inner wall of the mold so as to impart to the container its definite form. Due to the temperature shock generated by the explosion, the inner surface of the container is simultaneously sterilized.

20 Claims, 3 Drawing Sheets

PROCESS FOR PRODUCING STRETCH BLOW FORMED PLASTIC CONTAINERS

BACKGROUND OF THE INVENTION

1. Field of the Invention

The invention is in the field of plastic processing and concerns a method according to the generic part of the independent claim. The method serves for producing plastic containers through stretch blow molding. The plastic containers are made of a plastic material suitable for stretch blow molding and they are e.g. bottles made of polyethyleneterephthalate (PET).

2. Background Information

PET-containers, especially bottles made of this material, are normally produced by means of stretch blow molding. In most cases the bottles are made from an injection molded preform. The preform normally has a diameter which is smaller than the diameter of the bottle to be produced, an axial length which is smaller than the axial length of the bottle to be produced and an opening area (e.g. with thread and neck ring) which already has the form of the opening area of the bottle to be produced. The preform is heated to a temperature suitable for the stretch blow molding process and is positioned in a mold which corresponds to the form of the container to be produced. In this mold, the preform is stretched by means of a stretching rod introduced axially into the mold, whereby an inner pressure in the range of about 5 to 10 bar (stretching pressure) is applied for achieving an increase in diameter also. When the preform has been sufficiently stretched, i.e. when the stretching rod has reached its predetermined end position, the inner pressure is increased, normally up to a range of 40 to 50 bar (blowing pressure) whereby the preform is blown up, its walls being completely pressed against the mold and thus adopting the form of the bottle to be manufactured.

The pre-pressure (stretching pressure) necessary is normally generated by means of connecting the inside of the preform to a network of pressurized air. For generating the blowing pressure a special container for compressed air with a pump is provided which must comply to increased security regulations and thus necessitates a considerable investment.

If the stretch blow molded bottles or containers are used for foodstuffs or pharmaceuticals they are submitted to a sterilization process before filling, i.e. they are substantially freed of living organisms and germs. For this purpose they are treated with liquid or gaseous chemicals (mostly strong oxidants) with a sterilizing effect (poisonous to the organisms to be removed) or they are heated to a temperature at which the organisms cannot survive or they are irradiated, e.g. with ultraviolet light. Sterilization methods in which plasma-enhanced processes are applied for sterilization of containers are also known.

The main disadvantage of sterilization methods with sterilizing gases or liquids such as e.g. ethylene oxide, propylene oxide, chlorine dioxide, hydrogen peroxide, nitrogen oxide or sulfur dioxide is the fact that these substances are also poisonous to humans and that therefore, particular measures must be taken in order to prevent contact with such substances. Furthermore, some of these substances have undesired aromas such that they must be removed carefully after the sterilization process. Several of these substances are explosive under certain conditions which is a disadvantage according to the state of the art.

The main disadvantage of sterilization by means of heat is the fact that it is consuming a large amount of energy and that it requires a long time (time of treatment plus cooling time). This disadvantage is less important for thermo-shock-sterilizing e.g. described in the patent application DE-2,915,659. For thermo-shock-sterilization, the objects to be sterilized are exposed to a fast flowing current of humid air having a temperature of more than 500° C. and effecting sterilization within about two seconds. The time required for cooling is very short compared to traditional heating methods as only the surface of the objects to be sterilized is heated. However, it seems to be difficult to ensure that actually every single spot on the surface of the objects to be sterilized reaches a temperature sufficiently high for sterilization.

SUMMARY OF THE INFORMATION

The object of the invention is to create a method for producing plastic containers by means of stretch blow molding which method is to be more simple than similar methods according to the state of the art and into which method a possibly necessary sterilization of the inner surface of the manufactured containers is integrated.

This object is solved by the method for production of plastic containers as defined by the claims.

According to the inventive method, a preform is introduced into a mold and is stretched in axial direction by means of a stretching rod as is usual according to the state of the art. However, instead of generating the stretching pressure and the blowing pressure with the help of pressurized air as is usual according to the state of the art, an explosive gas mixture is pressed into the preform for creating the stretching pressure. As soon as the preform has been stretched to the desired degree, i.e. the stretching rod has reached a predetermined end position, the explosive gas mixture is ignited with suitable means. On explosion of the gas mixture, a pressure shock and thermal shock is created designed such that the pressure is sufficient for the blowing and the temperature is sufficient for the sterilization of the inner surface. As the pressure shock only lasts for a very short time and as the volume of the container increases to a considerable degree it can happen that the pressure in the container is not sufficient after the explosion to prevent post-explosive shrinking. In such a case it is necessary to continue pressing gas into the container after the explosion and to maintain the pressure in the range of the stretching pressure until the container material in the blown walls is totally stabilized.

Unlike according to the methods of the state of the art, according to the invention, it is not necessary to create a high blowing pressure outside of the container nor to sterilize the container after stretch blow molding. The container manufactured according to the inventive method is advantageously directly supplied to a filling step for being filled and sealed, all within the same arrangement of devices and under sterile conditions.

Temperatures occurring in explosions are very high in relation to the released energy. This means that actually only the inner surfaces of the plastic container are heated and thus sterilized such that containers made of relatively temperature-sensitive materials do not take damage in the method. It is possible that apart from the temperature shock, also the pressure shock or unstable particles with a poisonous effect being formed during the explosion contribute to the sterilizing effect on the surfaces exposed to the explosion.

The explosive gas mixture to be used substantially consists of a gaseous oxidant and an easily oxidizable gas or vapor. The oxidant in most cases is pure oxygen or the oxygen contained in air, the oxidizable component is e.g. hydrogen, methane, methanol ethane, propane, ethylene, propylene or chlorine etc.

The power of the pressure shock, i.e. the maximal pressure to be expected can be controlled, i.e. can be adapted to the conditions determined by the blow molding process, by corresponding composition of the gas mixture. If the gas mixture contains only the reaction partners and these in a stoichiometric relation, a shock-like pressure increase by a factor ten or more is to be expected. For smaller pressure increases, inert gases are added to the explosive mixture.

The temperature reached in the explosion is substantially dependent on the energy set free by the oxidation (i.e. on the kind of reaction partners) and it is dependent on the heat capacity of the gas mixture. This temperature is at its highest when the gas mixture only comprises the reaction partners in a stoichiometrical relation correct for the oxidation. For example, in an explosion of oxyhydrogen in which a stoichiometric oxygen-hydrogen mixture at standard temperature and pressure is exploded an energy of 2 KW or 7.2 MJ is set free per $m^3$ and temperatures of up to 3000° C. are reached. The released quantity of heat and thus the temperature created in the explosion can also be controlled by corresponding choice of the gases participating in the explosion and/or by the partial pressure of these actual reaction participants in the gas mixture.

The pressure conditions after the explosion are, within a closed preform, dependent on the pressure conditions before the explosion, on the temperature conditions before and after the explosion, on the volume increase due to the blowing effected by the explosion but also on the composition of the gas mixture and the characteristics of the chemical reaction partners.

The influence of the reaction partners is (at identical temperature and identical volume before and after the explosion) the following: if the number of particles in the gas mixture is increased due to the chemical reaction this effects an increase in pressure (at identical temperature and identical volume); if the amount of particles decreases this effects a pressure drop. If e.g. oxyhydrogen (mixture of $2H_2$ and $O_2$) is used as explosive gas mixture the oxidizing reaction is $2H_2+O_2 \rightarrow 2H_2O$, i.e. two particles are formed from three which causes the pressure to be lower after the explosion than before the explosion. If e.g. methane and oxygen are used as explosive gas mixture the reaction is $CH_4+2O_2 \rightarrow CO_2+2H_2O$, i.e. the number of particles remains the same and the pressure after the explosion is substantially the same as the pressure before the explosion. If methanol and oxygen are used as gas mixture the reaction is $2CH_3OH+3O_2 \rightarrow 2CO_2+4H_2O$, whereby the amount of particles increases in a relation of five to six, i.e. the pressure after the explosion is higher than the pressure before the explosion.

The mold used for the inventive method must be designed for the pressure created in the explosion. As similarly high pressures are used in methods according to the state of the art this does not cause additional cost. Because the explosive gas mixture constitutes a safety risk it is advantageous to mix and/or produce the components of the gas mixture as close as possible to the container to be manufactured by the explosion (oxyhydrogen generator 10 in FIG. 2). In order to prevent further safety risks it is advantageous to use non-toxic gases which lead to non-toxic oxidation products such as e.g. hydrogen and oxygen as explosive gas mixture from which water results as oxidation product.

For igniting the explosion e.g. a spark generator located in the container is activated by means of which a local temperature is created in the gas mixture which is sufficient for triggering the necessary explosive chain reaction (for oxyhydrogen at least 400° C.). Certain explosive gas mixtures can also be exploded by means of radiation through a correspondingly permeable container wall, e.g. detonating chlorine gas ($Cl_2+O_2$) by means of irradiation with UV-light.

In connection with the following Figures an exemplified and preferred embodiment of the inventive method for producing stretch blow molded plastic containers is to be described in more detail, whereby

DETAILED DESCRIPTION OF THE INVENTION

Figure 1:
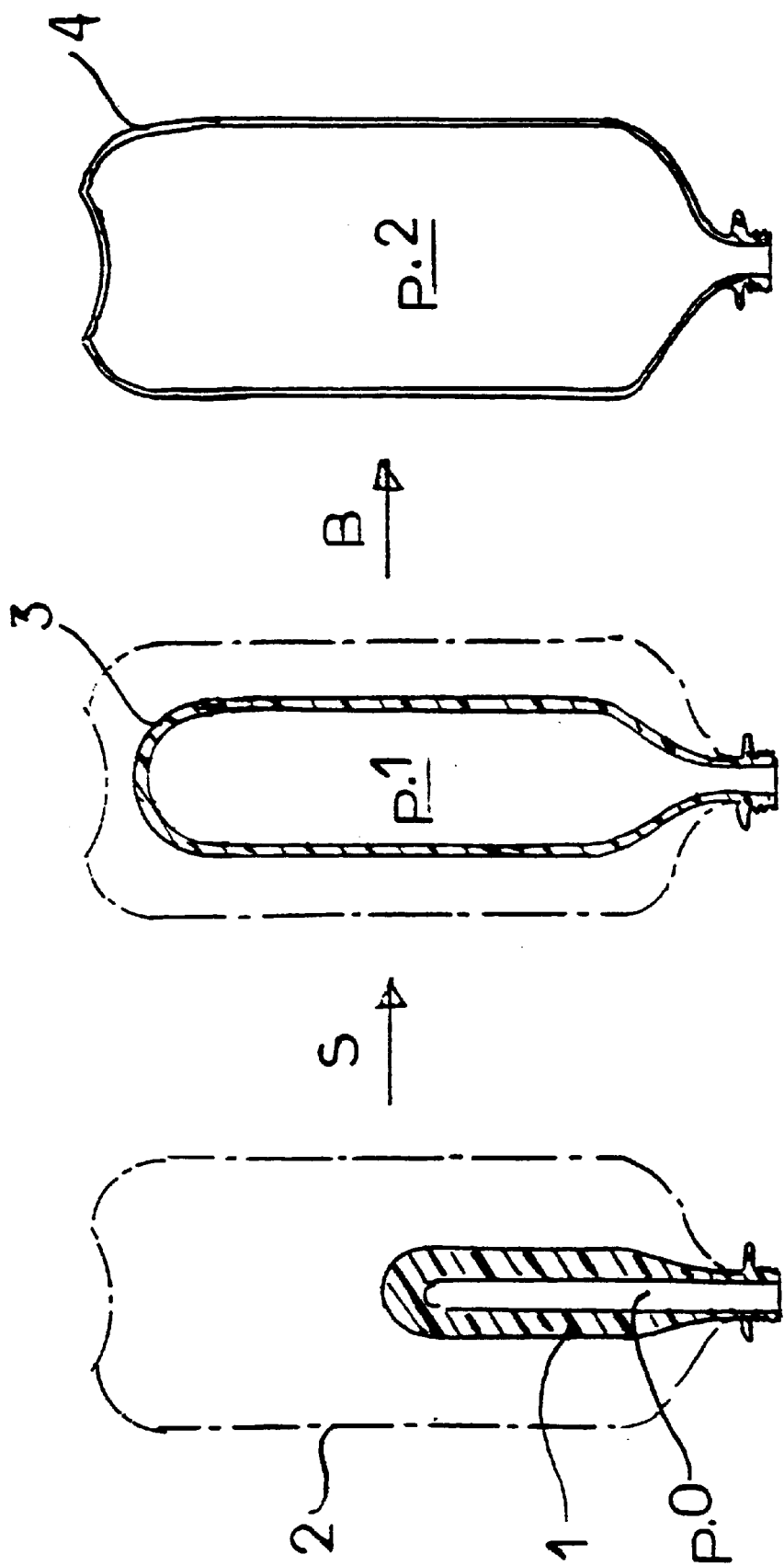
FIG. 1 is a schematic drawing which shows the successive phases of the inventive method for producing a PET-bottle illustrating the change of form from the preform to the finished container (sections parallel to the axis of the preform or of the container being formed from it)
Figure 2:
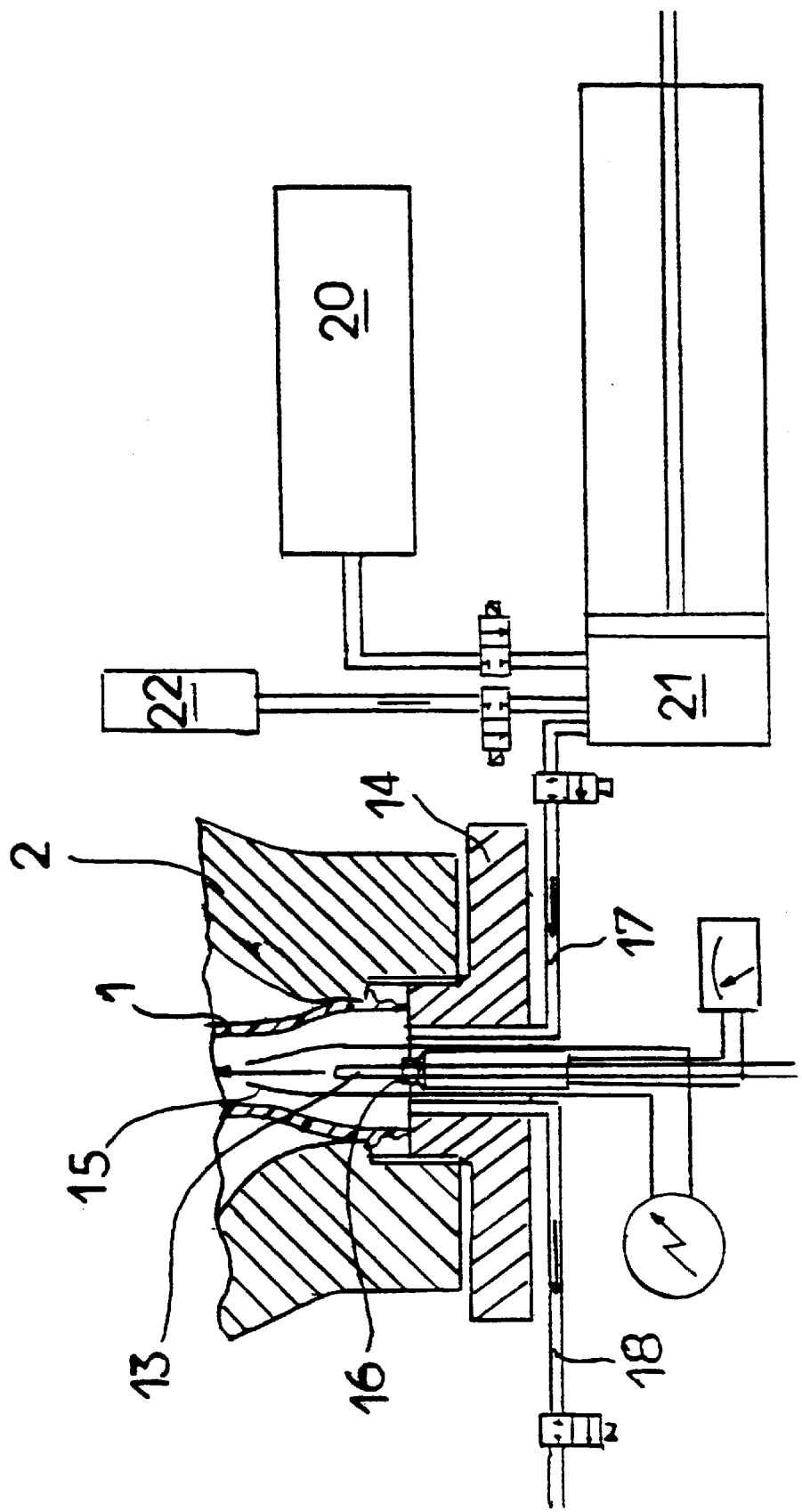
FIGS. 2 and 3 are schematic drawings which show two exemplified arrangements (in section) for carrying out the method according to FIG. 1.
Figure 3:
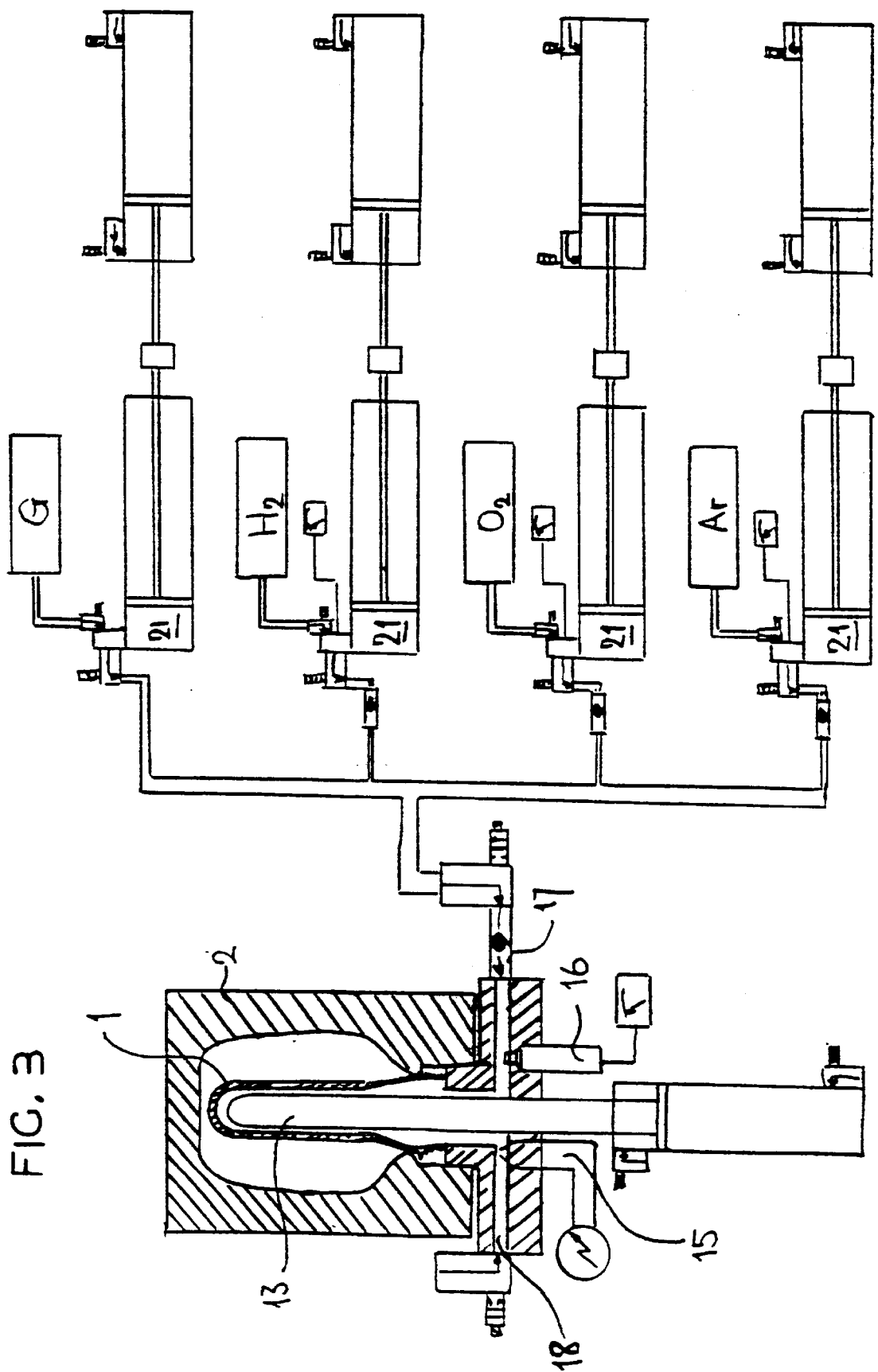

FIGS. 1 to 3 show a preferred embodiment of the inventive method and two exemplified arrangements for carrying out this method. It is the production of PET-bottles by means of stretch blow molding a corresponding preform using an explosion of oxyhydrogen.

FIG. 1 shows the preform 1 being the starting product of the inventive method and being exactly the same as a preform used in known stretch blow molding processes for producing PET-bottles of a predetermined form. The preform 1 is preheated to a temperature of 100 to 120° C. and is introduced into the mold 2, whereby the mold has a temperature of about 20° C. and clamps the preform in its opening area. The preform 1 is then filled with oxyhydrogen increasing the pressure in the preform from ambient pressure p.0 to a stretching pressure p.1 of at least 2 bar (usually 5 to 10 bar) necessary for the stretching step S. At the same time, the preform 1 is stretched with the help of a stretching rod (not shown) causing the preform to be stretched to the stretchform 3. The composition of the used oxyhydrogen for a stretching pressure of 2 bar is the following: stoichiometric oxyhydrogen with a partial pressure of about 1.1 bar and argon with a partial pressure of about 0.9 bar.

As soon as the stretching rod has reached its predetermined end position (substantially identical to a method according to the state of the art) the gas mixture is ignited by means of a spark generator arranged inside the preform. The explosion generates a pressure shock with a pressure at least corresponding to a blowing pressure p.2 in the range of 40 bar, which is necessary for blow molding the container. The temperature shock reaches temperatures in the range of 600° C. (measured on the inner surface of the container). The wall of the stretchform 3 is pressed completely onto the inner wall of the mold 2 by which, like in a known blowing method, a bottle 4 is formed.

It shows that the bottle produced according to the inventive method has the same properties as a corresponding bottle produced in a method according to the state of the art and that its inner surfaces fulfill the requirements concerning sterility for foodstuffs and beverages without problems. This means that neither the extremely high speed of the pressure build-up in the explosion nor the height of the temperatures which are generated by the explosion have a negative influence on the material of the bottle wall. Therefore, the inventive method, although being considerably more simple than corresponding methods according to the state of the art, makes it possible to produce containers of a similar predetermined quality.

FIG. 2 shows schematically a part of an arrangement for carrying out the embodiment of the inventive method as discussed in connection with FIG. 1. The preform 1 to be stretch blow molded to form a bottle is arranged in the mold 2 and is sealed with a connection piece 14. The connection piece 14 carries a spark generator 15 protruding into the preform 1, a pressure probe 16, a gas inlet 17 for feeding the explosive gas mixture and a gas drain 18 for flushing. Furthermore the connection piece 14 comprises an opening through which a stretching rod 13 is introduced. For the stretching, the stretching rod is driven by means of a suitable drive (not shown).

For production and dosage of the explosive gas mixture, an oxyhydrogen generator 20 is provided in which hydrogen and oxygen are produced in a stoichiometric ratio by electrolysis of water. The oxyhydrogen is dosed into the preform 1 and compressed by means of a dosage cylinder 21. For the addition of a further gas (e.g. methanol or acetone vapor or inert gas) to the oxyhydrogen, a storage container 22 with a supply connection to the dosage cylinder is provided.

FIG. 3 shows an arrangement similar to the one of FIG. 2. Identical components are denominated with the same reference numbers. In opposition to FIG. 2, the explosive gas mixture is not supplied by an oxyhydrogen generator but is supplied from three storage containers. These contain hydrogen $H_2$, oxygen $O_2$ and argon Ar. The three components of the gas mixture are pressed into the preform 1 in succession by means of the dosage cylinder 21. A further storage vessel and a further dosage cylinder are provided for a further gas G, e.g. sterile air. By supplying this gas G into the stretch blow molded bottle after the explosion, the stretching pressure is maintained for preventing post-explosive shrinking of the container.

The arrangement according to FIG. 3 can be used for any other explosive gas mixtures with or without addition of an inert gas.

What is claimed is:

1. A method for the production of containers from a material for stretch blow molding comprising
   (a) heating a preform having a wall to a temperature for stretch blow molding,
   (b) introducing the resultant heated preform from step (a) into a mold having a cavity corresponding to a container to be molded, the preform having an inner wall,
   (c) creating a stretching pressure in the preform by introducing an explosive gas mixture into the preform,
   (d) stretching the preform axially with the aid of a stretching rod,
   (e) creating a blowing pressure higher than the stretching pressure in the resultant stretched preform by exploding the explosive gas mixture, and
   (f) pressing the wall of the preform against the inner wall of the mold to form the container.

2. The method according to claim 1, wherein after the explosion of the explosive gas mixture, the container is maintained at the stretching pressure for preventing a post-explosive shrinking of the container.

3. The method according to claim 2, further comprising introducing sterile air into the molded container to maintain the stretching pressure.

4. The method according to claim 3, wherein the explosive gas mixture is ignited by a spark generator positioned in the preform or by radiation from outside the preform.

5. The method according to claim 4, wherein the explosive gas mixture contains an oxidant and an oxidizable component, said oxidant being oxygen; said oxidizable component being selected from the group consisting of hydrogen, chlorine, methane, methanol, ethane, ethylene, propane and propylene.

6. The method according to claim 5, wherein the explosive gas mixture contains components which are introduced into the preform individually after each other.

7. The method according to claim 6, which further comprises introducing an inert gas into the explosive gas mixture for controlling the development of temperature and pressure.

8. The method according to claim 5, wherein the explosive gas mixture is oxyhydrogen that is produced directly before the exploding and the oxyhydrogen is produced in an oxyhydrogen generator by electrolysis of water.

9. The method according to claim 8, wherein the preform comprises polyethyleneterephthalate; the explosive gas mixture is oxyhydrogen having a stoichiometric composition and the oxyhydrogen is introduced into the preform at a stretching pressure of at least 2 bar.

10. The method according to claim 9, wherein argon is added to the oxyhydrogen as inert gas; the oxyhydrogen has a partial pressure of approximately 1.1 bar and argon has a partial pressure of approximately 0.9 bar in the preform.

11. The method according to claim 9, which further comprises supplying the container produced from the preform to a filling plant under sterile conditions where the container is filled with food or with a beverage.

12. The method according to claim 1, wherein the explosive gas mixture is ignited by a spark generator positioned in the preform or by radiation from outside the preform.

13. The method according to claim 1, wherein the explosive gas mixture contains an oxidant and an oxidizable component, said oxidant being oxygen and said oxidizable component being selected from the group consisting of hydrogen, chlorine, methane, methanol, ethane, ethylene, propane and propylene.

14. The method according to claim 1, wherein the explosive gas mixture contains components which are introduced into the preform individually after each other.

15. The method according to claim 1, wherein the explosive gas mixture is oxyhydrogen that is produced directly before the exploding and the oxyhydrogen is produced in an oxyhydrogen generator by electrolysis of water.

16. The method according to claim 1, which further comprises introducing an inert gas to the explosive gas mixture for controlling the development of temperature and pressure.

17. The method according to claim 1, wherein the preform comprises polyethyleneterephthalate; the explosive gas mixture is oxyhydrogen having a stoichiometric composition and the oxyhydrogen is introduced into the preform at a stretching pressure of at least 2 bar.

18. The method according to claim 17, wherein argon is added to the oxyhydrogen as inert gas.

19. The method according to claim 18, wherein the oxyhydrogen has a partial pressure of approximately 1.1 bar and argon has a partial pressure of approximately 0.9 bar in the preform.

20. The method according to claim 17, which further comprises supplying the container produced from the preform to a filling plant under sterile conditions where the container is filled with food or with a beverage.

* * * * *